Dec. 12, 1950     E. A. MORLAN ET AL     2,533,258
DRILL CUTTER

Filed Nov. 9, 1945     3 Sheets—Sheet 1

E. A. MORLAN
H. B. WOODS
INVENTORS

BY Lester B. Clark

ATTORNEY.

Dec. 12, 1950  E. A. MORLAN ET AL  2,533,258
DRILL CUTTER

Filed Nov. 9, 1945  3 Sheets-Sheet 2

E. A. MORLAN
H. B. WOODS
INVENTORS

BY Lester B. Clark

ATTORNEY

Dec. 12, 1950     E. A. MORLAN ET AL     2,533,258
DRILL CUTTER

Filed Nov. 9, 1945     3 Sheets-Sheet 3

E. A. MORLAN
H. B. WOODS
INVENTORS

BY Lester B. Clark

ATTORNEY.

Patented Dec. 12, 1950

2,533,258

UNITED STATES PATENT OFFICE 2,533,258

DRILL CUTTER

Erwin A. Morlan and Henry B. Woods, Houston, Tex., assignors to Hughes Tool Company, Houston, Tex., a corporation of Delaware Application November 9, 1945, Serial No. 627,657

7 Claims. (Cl. 255—71)

The invention relates to drill cutters for use in the drilling of wells for oil, gas, and the like.

The present invention is in the form of a modification of the general arrangement disclosed and claimed in the copending application for patent of Henry B. Woods and Floyd L. Scott, Serial No. 597,304, for Drill cutters, filed June 2, 1945, and constitutes a different arrangement of the circumferential or fractional disc teeth or cutting elements.

In the drilling of wells, which sometimes are of great depth—such as, ten or fifteen thousand feet—by the rotary method, there are used rotary drills provided with cutters of general conical shape which are rotatably mounted. Such drills are fastened to the lower end of a hollow drillstem which is rotated by suitable mechanism at the surface. The cutters roll upon the bottom of the hole as the drillstem is revolved, and disintegrate the materials to be removed. Such roller cutters are provided with teeth which are forced to penetrate the well bottom by weight of the drill stem, the same being controllable by the operators.

The disintegrated materials from the sides and the bottom of the hole are removed by a fluid which is pumped from the surface through the hollow drillstem, and are carried to the top and removed. The fluid not only thus serves to remove the cuttings but it also cleans and cools the cutters.

The form of the teeth and the arrangement of the same upon the cones are of great importance. It is desirable, as far as may be, to provide and arrange a cutting structure that will work well in a plurality of different formations so as to minimize the necessity of withdrawing the drill before it has exhausted its usefulness, in order to meet the requirements of varying formations.

Some of the very hard formations that must be drilled—such as quartzite, hard sandy dolomite, or dolomite with chert or flint concretions encountered in formations of the Paleozoic era—have high compressive strength; also, in the main, they are very abrasive. To drill such hard abrasive formations requires the application of unusually heavy weight upon the drill to accomplish a satisfactory rate of penetration as well as to secure a maximum footage per bit.

As the usual type of pyramidal teeth upon the cutters of the drill stem become worn, the area of contact of the dulled teeth on the formation increases to such an extent as to require the application of increasing weight on the drill that may easily extend beyond the capacity of present-day drilling equipment. In some instances, it has been found that as much as fifty thousand pounds weight must be applied to drill with an 8¾" diameter bit to secure practical drilling results. Since there are obvious limits to the strength of the parts of the drill, there is, therefore, a need for a cutting structure on the substantially conical cutters which will permit of a satisfactory rate of drilling with a medium weight such as 20,000# to 30,000#, so that said cutting structure will continue to function well until it has been practically worn away in service. To this end, it is desirable to provide a cutting structure not easily broken and one that requires a minimum of weight upon the drill as the teeth of the cutters become dulled or shortened in operation. To accomplish these results, we have provided in our invention a strong cutting structure such that as the cutting elements are worn off their area of contact on the well bottom will not greatly increase.

An object of the invention is to provide a circular, flat-crested cutting element for the cone-shaped cutters, the crest area of which will not rapidly increase as the cutting element wears, so that the bit will maintain a desirable rate of penetration throughout the life of the cutters without necessity of unduly increasing applied weight.

Another object of the invention is to provide an outer row of longitudinal teeth in combination with a plurality of inner, circumferential rows of flat-crested cutting elements, the said outer row or rows to assist in the rotation of the cutters.

A third object is to provide a set of generally cone-shaped cutters having strong, segmental, flat-crested, circumferentially arranged cutting elements, spaced longitudinally of one of said cutters, the sum of the crest lengths of the segments in any row being less than the full circumference of said row, so that lower initial weight will be required to make said cutting elements penetrate the formation for more rapid excavation of the material to be drilled.

Another object of the invention is to provide a set of generally cone-shaped cutters having segmental, flat-crested, circumferentially extending cutting elements spaced longitudinally of said cutters, with such elements on adjacent rows staggered longitudinally, while the cutting elements on each of said cutters are staggered circumferentially so that as the cutters rotate, the weights will not only be better distributed around each cutter as it rolls on the well bottom, but said weight will be more evenly distributed between companion cutters of the set for better traction and prevention of intermittent overloading.

Another object is to provide a plurality of longitudinal cutter teeth upon a cone cutter with a web joining one end of each tooth with the adjacent tooth on one side and with another web extending from the opposite end of the same tooth to the next adjacent tooth on the opposite side to crush the ends of the rock teeth formed in the bottom of the hole by said longitudinal teeth.

Another object of the invention is to provide circumferential rows of cutting teeth where each row consists of three cutting elements.

Another object of the invention is to provide a conical cutter for rotary drill bits wherein longitudinally spaced circumferential rows of cutting elements are provided and where each succeeding row has one greater number of cutting elements as the rows progress from the apex of the cone.

Another object of the invention is to provide a balanced conical cutting member which will carry more evenly distributed the load applied thereto and wherein at least three impacts per revolution will occur with each row of cutting elements.

Still another object of the invention is to provide a conical cutter for rotary drill bits wherein the length of the cutting element in each row approximates ⅓ of the circumference of the row.

A still further object of the invention is to provide a plurality of conical cutters for a rotary drill bit having longitudinally extending heel teeth some of which are joined with an interrupted circumferential web and wherein one of the conical cutters has a lesser number of teeth and a lesser number of notches in the circumferential web than is present in the other cutter.

Other and further objects of the invention will be readily apparent when the following description is considered in connection with the accompanying drawings wherein.

Figure 1:
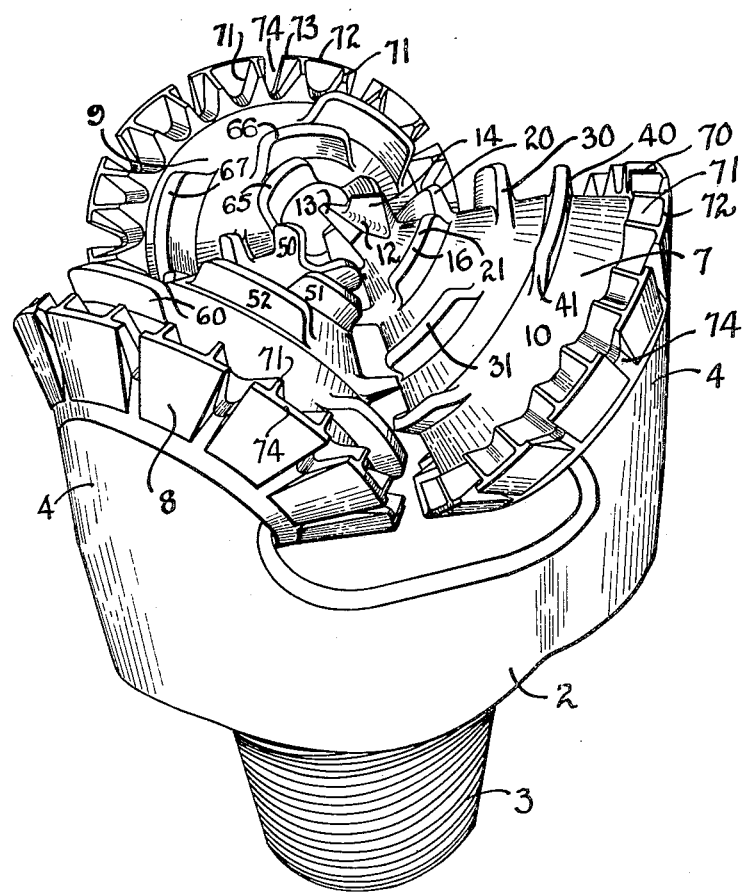
Fig. 1 is a perspective view looking at the bottom of a well drill constructed in accordance with the invention and illustrates the arrangement of the flat crested longitudinal rows of circumferential cutting elements.

In Fig. 1 the bit body 2 has the threaded pin member 3 thereon by which it is connected to the drill collar or drill stem for rotation, it being understood that Fig. 1 shows the bit upside down with respect to its position in actual use but it has been so illustrated in order to show the arrangement of the cutting elements with respect to the cones and with respect to each other.

The body 2 has three downwardly projecting legs 4, which are equally spaced circumferentially. Each leg has suitable bearing structures thereon to support the conical cutters 7, 8 and 9. These cutters are generally respectively designated as cones No. 1, No. 2, and No. 3, with cone 7 being the No. 1 cone, cone 8 being the the No. 2 cone, and cone 9 being the No. 3 cone. Each cone is slightly different from the other in order to provide for interfitting of the cones so as to permit a larger size cone than would be possible if the cutting elements of the respective cones did not interfit.

Figure 2:
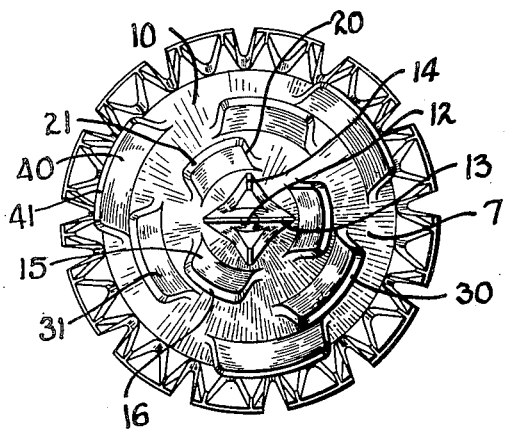

The No. 1 cone, or the cone designated by the reference character 7, is seen in plan view in Fig. 2 and comprises a conical body 10 which has a spear point 12 at its apex. This spear point is provided with the cutting edges 13 and 14 which tend to cut the center portion of the formation upon which the bit is rotated.

Spaced longitudinally along the cone is the first row 15 of the cutting elements. This row is made up of three elements 16 which are identical and symmetrically arranged circumferentially of the cone body 10. Each of these cutting elements is constructed as described in the copending application heretofore mentioned in that they are segments of a circular member which project from the periphery of the cone body 10 and are of substantially uniform thickness, as seen at 20. They have the flat crest 21 which will contact with the formation and as wear occurs there is substantially no increase in the area of metal of the cutting element 16, which comes in contact with the formation.

With this arrangement it is intended that the same amount of weight may be applied to the drill bit to perform the cutting action during the entire life of the cutting element or until they are worn down to the periphery of the cone 10.

The next row 30 of the cutting element is also made up of three elements 31 which are symmetrically spaced circumferentially and are staggered with respect to the elements 16 in the first row. The elements 31 are somewhat longer circumferentially than the elements 16 but of course the path which is traveled by these elements 31 is of greater length than the path traveled by the elements 16 because they are spaced further along the conical cutter, it being the intention that the length of the cutting elements in any row shall equal substantially the same percentage of the circular length of the row as occurs in any of the other rows.

The outer row 40 of the circumferential cutting elements is made up of the elements 41, which are three in number and which are symmetrical circumferentially spaced as have been the cutting elements previously described. The elements of the row 40 are staggered with respect to the elements in the previous row, it being the intention that the cutting elements of the three rows when taken as a whole shall be so arranged that at least one of the cutting elements in one of the rows will be in contact with the formation being cut or will be "on bottom" so as to support the load applied to the bit in effecting a cutting action.

An advantage of this arrangement resides in the fact that the teeth are symmetrical and balanced as regards the cone itself so that a smooth running balanced bit results.

Figure 3:
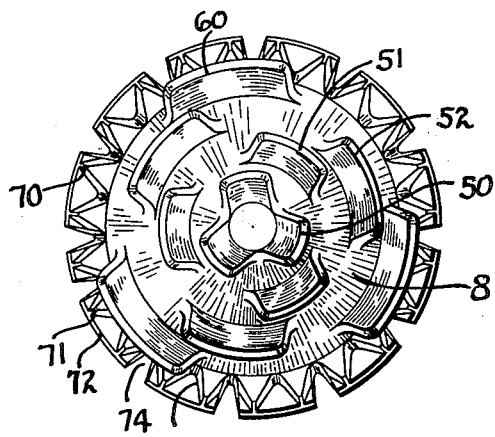

The No. 2 cone or cone 8 is seen in Fig. 3 and is quite similar to the cone 7 of Fig. 2 except that the spear point 12 is omitted and the first row 50 of teeth are approximately at the apex of the cone so that the teeth as seen in Fig. 3 are rather small or short circumferentially while the rows 51 and 52 are quite similar to the rows 30 and 40 of the cone 7.

Due to the fact that the first row 50 is close to the apex a fourth row 60 has been provided and the teeth of this row are somewhat longer than the teeth of the row 52. All four of the rows of this cone 8 have the cutting elements thereof staggered circumferentially with respect to each other so that at least one of the cutting elements or teeth will be on bottom at all times.

The cone 9 of Fig. 1 is best seen in Fig. 4 and here again there are three rows 65, 66 and 67 of cutting elements which are quite similar to the rows 20, 30 and 40 of Fig. 2.

The rows of the cone 7 are longitudinally arranged so that they interfit, as best seen in Fig. 1, with the rows 50, 51, 52 and 60 of cutting elements of the cone 8 on one side and the rows 65, 66 and 67 of the cone 9 on the other side. In turn the cutting elements of the cones 8 and 9 interfit with each other, so that the cutting elements of each cone interfit with the cutting elements of the other two cones. Such an arrangement provides for a greater size of cone than would be possible if the cutting elements did not interfit.

Each of the cones 7, 8 and 9 are provided with a row of heel teeth 70, as seen in Fig. 1. These teeth extend longitudinally of the cone and are spaced apart by the recesses or grooves 71. These teeth track on the bottom of the formation being cut and tend to cause the cones to rotate as the bit body 2 is turned in the hole. In order to cut the gage and to avoid the forming of rock teeth in the formation being cut some of the heel teeth 70 have been joined with a circumferential web 72. This web is shown generally as spanning the space between two of the heel teeth or one of the recesses 71. The web is shown as projecting at 73 beyond the heel teeth 71. This circumferential web 72 is interrupted by a plurality of notches 74 positioned between some of the heel teeth 71. In actual operation it has been found that an interrupted web of this sort results in the proper cutting of the gage of the bore and cuts loose the connection with the side wall of any rock teeth which tend to form on the bottom of the well bore. The rock teeth are then cut by the heel teeth rather than causing the heel teeth to skid over such rock teeth where the rock teeth are not severed from the side wall.

Particular attention is directed to the fact that at least one of the cones has a lesser number of heel teeth 71 and a lesser number of notches 74 than the other cutters. In this manner the cutters do not track one with the other and the formation of rock teeth and the cutting of the side wall is accomplished. For instance, the cone 7, as seen in Fig. 2, has thirteen notches and twenty-five teeth, as does the cone 9 of Fig. 4, whereas the cone 8 of Fig. 3 has but twelve notches and twenty-three teeth. These ratios may be varied as described and, of course, the number of teeth and number of notches on any cone may vary on different cones of the same size or on different sizes of cones.

Figure 4:
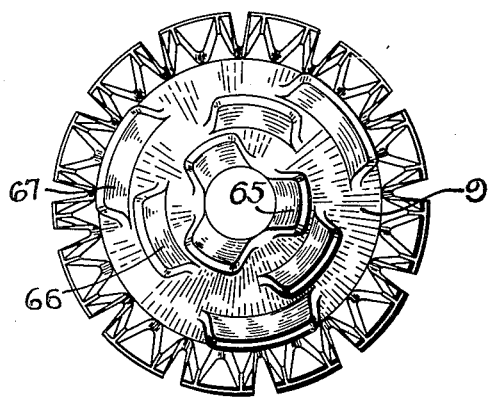
Figs. 2, 3 and 4 are plan views looking directly at the three conical cutters of the bit shown in Fig. 1.
Figure 7:
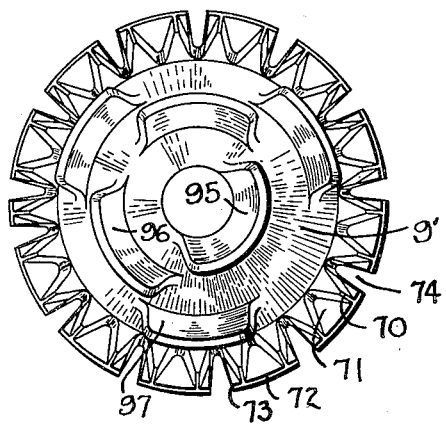
Figs. 5, 6 and 7 are plan views looking directly at the three cutters respectively where the cutting elements have been modified somewhat so that each succeeding longitudinal row from the apex of the cone contains one greater number of cutting elements.
Figure 6:
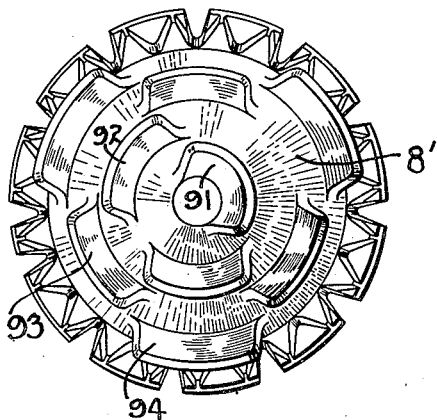
Figure 5:
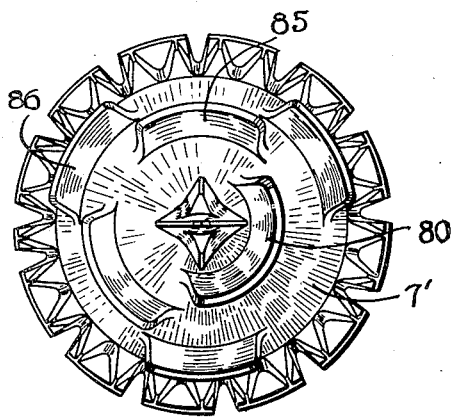

Figs. 5, 6 and 7 show three cones which are somewhat similar to the cones of Figs. 2, 3 and 4, respectively. In the cone 7′ of Fig. 5, the spear point is the same as previously described in Fig. 2, but the first row of cutting elements 80 consists of a single tooth or cutting element, which extends somewhat less than one-half of the circumferential length of the row.

The next row 85 is made up of two teeth positioned about on the one third points of the cones, while the outer row 86 is made up of three teeth. In this arrangement each succeeding row, such as 85 and 86, from the apex of the cone contains one greater number of teeth but it is intended that the ratio of circumferential length of the cutting element with respect to the circumference of the row shall be maintained approximately constant as to each row. In other words, the ratio of the length of the cutting element, or elements, of each row as compared to the circumferential length of the row shall be the same for each row. This same arrangement prevails for the cones 8′ of Fig. 6, with the rows 91, 92, 93 and 94, respectively, positioned along the cone. Fig. 7 shows the cone 9′ having the rows 96, 97 and 98 positioned along the cone. The difference in longitudinal positioning of the rows on the cone is substantially the same as the previously described cones so as to accomplish interfitting of the cutting elements. The arrangement of the heel teeth 70, recess 71 and webs 72 is the same as previously described.

What is claimed is:

1. In a well drill having a plurality of approximately conical shaped cutters mounted to roll upon the well bottom, a row of heel teeth on each of said cutters, cutting elements arranged in rows circumferentially about the cutters inwardly from the heel teeth, each element comprising a segment extending substantially one-sixth of the way around the cone, the segments in successive rows on a cutter being staggered circumferentially.

2. In a cone type well drill, a rotatable cone, the combination of an outer row of projections disposed to cut longitudinally of the cone, and a plurality of inner rows of flat crested projections disposed circumferentially of the cone, said inner rows each consisting of three interrupted circumferential ridge-like segments.

3. A well drill having rotatable conical cutters, a row of heel teeth on each of said cutters, a plurality of circumferential cutting elements on each cutter inwardly from said heel teeth, said elements being arranged in longitudinally spaced rows consisting of three equally circumferentially spaced elements in each row so as to create three impacts against the formation by each row of elements upon each revolution of each conical cutter.

4. A conical cutter for rotary drill bits comprising a conical body, a row of heel teeth on said body, a plurality of circumferential rows of cutting elements spaced longitudinally along the peripheral surface on said body inwardly from said heel teeth, each row consisting of three circumferentially spaced rib-like cutting elements.

5. A conical cutter for rotary drill bits comprising a conical body, a row of heel teeth on said body, a plurality of circumferential rows of cutting elements spaced longitudinally along the peripheral surface on said body, each row consisting of three circumferentially spaced rib-like cutting elements where such elements are symmetrically spaced.

6. A conical cutter for rotary drill bits comprising a conical body, a row of heel teeth thereon, a plurality of circumferential rows of cutting elements spaced longitudinally along the peripheral surface on said body inwardly from said heel teeth, each of said circumferential rows consisting of three circumferentially spaced rib-like cutting elements where such elements are symmetrically spaced with the elements of adjacent rows staggered so that at least one element of one row is always on bottom to utilize the load on the bit to effect cutting of the formation.

7. A conical cutter for drill bits comprising, a conical body, a circumferential row of heel teeth thereon, a plurality of circumferential rows of cutting elements spaced along the peripheral surface of the body, each of said elements comprising an arcuate rib-like member of substantially uniform transverse thickness from its crest to its base, the elements of said plurality of rows being staggered and of such arcuate extent that the ratio of the length of the cutting elements of each row as compared to the circumferential length of the row is substantially the same for each row.

ERWIN A. MORLAN.
HENRY B. WOODS.

REFERENCES CITED

The following references are of record in the file of this patent:

UNITED STATES PATENTS

| Number | Name | Date |
|---|---|---|
| 1,840,390 | Failing | Jan. 12, 1932 |
| 1,863,084 | Chambers | June 14, 1932 |
| 1,957,532 | Flynn | May 8, 1934 |
| 2,027,700 | Rogatz | Jan. 14, 1936 |
| 2,038,387 | Scott | Apr. 21, 1936 |
| 2,177,332 | Reed | Oct. 24, 1939 |
| 2,177,333 | Reed | Oct. 24, 1939 |
| 2,363,202 | Scott | Nov. 21, 1944 |